United States Patent
Shaffer et al.

(10) Patent No.: US 8,160,112 B2
(45) Date of Patent: Apr. 17, 2012

(54) BUFFERING A MEDIA STREAM

(75) Inventors: Shmuel Shaffer, Palo Alto, CA (US);
James C. Frauenthal, Colts Neck, NJ (US); Michael P. O'Brien, Manasquan, NJ (US); Larry Raymond Metzger, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 560 days.

(21) Appl. No.: 11/856,461

(22) Filed: Sep. 17, 2007

(65) Prior Publication Data
US 2009/0074012 A1 Mar. 19, 2009

(51) Int. Cl.
*H04J 3/06* (2006.01)
(52) U.S. Cl. ........................................ 370/516
(58) Field of Classification Search .............. 370/516, 370/519, 517
See application file for complete search history.

(56) References Cited

U.S. PATENT DOCUMENTS

| | | | |
|---|---|---|---|
| 6,748,000 B1 * | 6/2004 | Vainikainen et al. | 370/517 |
| 2003/0235217 A1 * | 12/2003 | Verreault | 370/519 |
| 2004/0047369 A1 * | 3/2004 | Goel | 370/516 |
| 2004/0057445 A1 * | 3/2004 | LeBlanc | 370/412 |
| 2005/0002379 A1 * | 1/2005 | Bye | 370/352 |
| 2005/0207437 A1 * | 9/2005 | Spitzer | 370/412 |

* cited by examiner

*Primary Examiner* — Derrick Ferris
*Assistant Examiner* — Maharishi Khirodhar
(74) *Attorney, Agent, or Firm* — Schwegman, Lundberg & Woessner, P.A.

(57) ABSTRACT

An apparatus and method of buffering a media stream is provided. The method may comprise receiving a plurality of IP packets of the media stream, each packet providing a fragment of a portion of the media stream. Thereafter, the portion of media stream may be buffered in a jitter buffer using the fragments provided by the received packets. Further, the portion of the media stream may be buffered in a replay buffer using the fragments provided by the received packets. The replay buffer may be larger than the jitter buffer and a first received fragment and a second received fragment may be combined. The second received fragment may have been discarded by the jitter buffer. A media stream may then be played back using media from the replay and/or jitter buffer.

22 Claims, 6 Drawing Sheets

BUFFERING A MEDIA STREAM

FIELD

This application relates generally to the communication of media streams over packet-switched networks and particularly to buffering a media stream.

BACKGROUND

When a media stream, such as a voice stream, is transmitted over a packet-switched network, such as an IP network, the media stream is packetized into a plurality of packets that may arrive at a destination endpoint asynchronously. A jitter buffer can be implemented to remove the effects of jitter (e.g. delayed or asynchronous packets) from the voice stream, buffering each arriving packet for a short interval before playing it out. Packets that arrive after the buffering interval provided by the jitter buffer are discarded. Therefore, this buffering process introduces a delay and packet loss, two undesirable effects that must be balanced. A deep or long jitter buffer provides more time for late-arrival of packets but introduces a longer delay. Conversely, a shallow or short jitter buffer introduces a short delay but provides less time for late-arrival of packets and therefore more packets are discarded.

A fixed jitter buffer maintains a constant size whereas an adaptive jitter buffer has the capability of adjusting its size dynamically to optimize the tradeoff between the delay introduced and the packets discarded. Existing jitter buffer algorithms queue voice packets in a jitter buffer prior to reassembling them into the voice stream and playing back the stream. If a packet gets delayed for longer than the overall delay of the jitter buffer, media rendering software employs a packet loss concealment (PLC) algorithm and substitutes the late arriving (or lost) packet with a synthetic replacement voice packet. If the real voice packet arrives later, it is discarded by the media rendering software.

BRIEF DESCRIPTION OF DRAWINGS

Example embodiments are illustrated by way of example and not limitation in the figures of the accompanying drawings, in which like references indicate similar elements and in which.

DETAILED DESCRIPTION OF EXAMPLE EMBODIMENTS

In the following description, for purposes of explanation, numerous specific details are set forth to provide a thorough understanding of example embodiments. It will be evident to one skilled in the art that the example embodiments may be practiced without these specific details.

Overview

An apparatus and method of buffering a media stream is provided. The method may comprise receiving a plurality of IP packets of the media stream, each packet providing a fragment of a portion of the media stream. Thereafter, the portion of media stream may be buffered in a jitter buffer using the fragments provided by the received packets. Further, the portion of the media stream may be buffered in a replay buffer using the fragments provided by the received packets. The replay buffer may be larger than the jitter buffer and a first received fragment and a second received fragment may be combined. The second received fragment may have been discarded by the jitter buffer. A media stream may then be played back using media from the replay and/or jitter buffer.

Detailed Description of the Drawings

Figure 1:
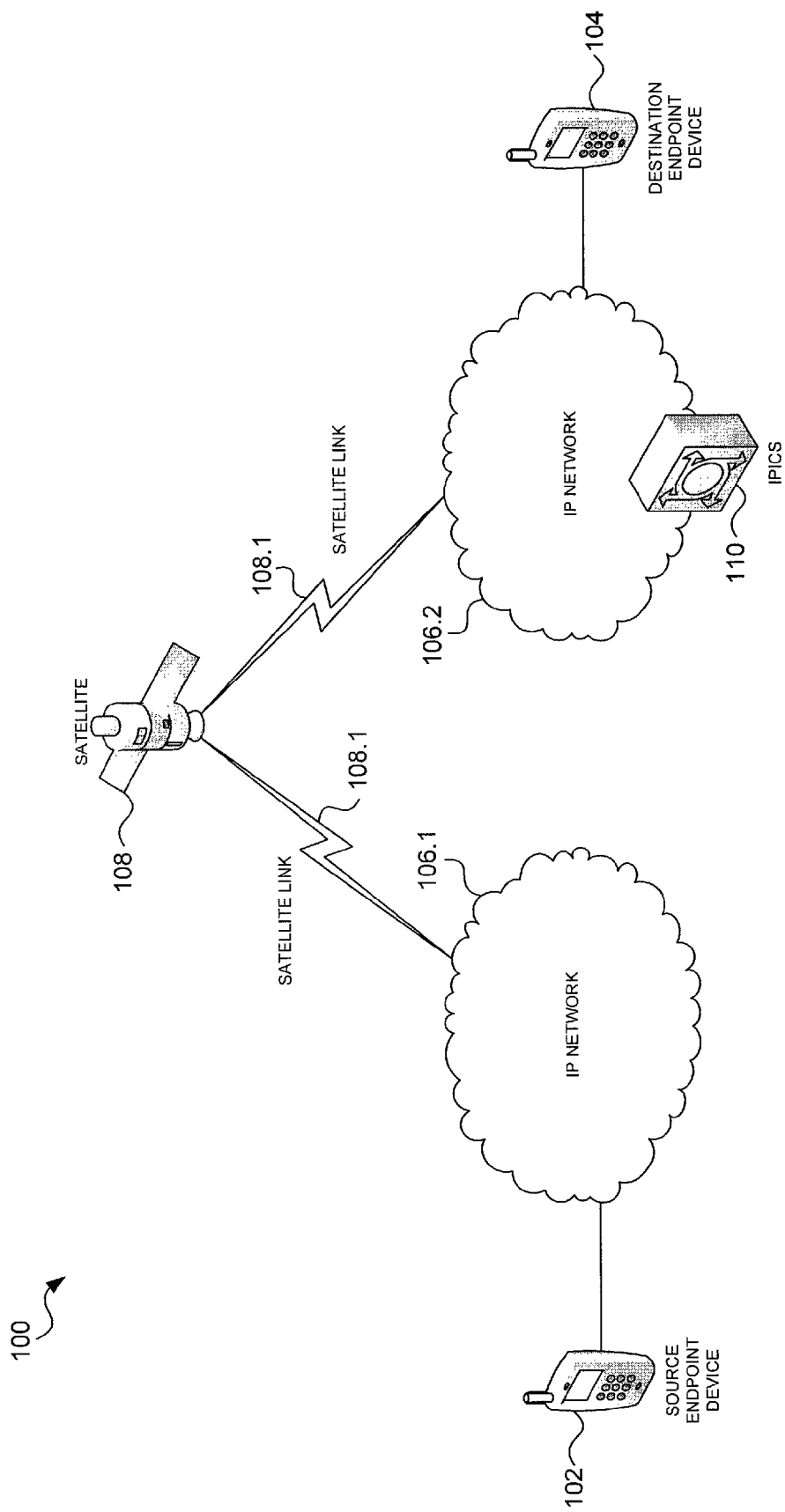
FIG. 1 shows a system, in accordance with an example embodiment, for buffering a media stream.

FIG. 1 shows a system, generally indicated by reference numeral 100, in accordance with the example embodiment, for buffering a media stream. The system 100 may include a plurality of endpoint devices, but for ease of illustration, two endpoint devices are shown. The system 100 is shown by way of example to include a source endpoint device 102 and a destination endpoint device 104. The endpoint devices 102, 104 may be any devices capable of communicating (e.g. sending or receiving) a media stream. Although the system 100 may be operable to buffer any media stream, example embodiments will be further described with reference to a media stream in the form of an audio stream, particularly a voice stream. Thus, the endpoint devices 102, 104 may be telephony endpoint devices, for example VoIP telephones, computers with CTIs (Computer Telephony Interfaces), mobile telephones, satellite phones, or the like. In an example embodiment in which the media stream includes video, the endpoint devices 102, 104 may include display screens (e.g., when the endpoint devices 102, 104 are in the form of video telephones or computer terminals).

The endpoint devices 102, 104 may be in communication via a telecommunications network, at least a portion of which may include a packet-switched network such as an IP network. Although the telecommunications network may be thought of conceptually as a single network, such as the Internet, for ease of explanation, an example embodiment is described with reference to first and second IP networks 106.1, 106.2. The IP networks 106.1, 106.2 may be LANs, WANs, or the like, interconnected by a satellite 108 via a satellite link 108.1. The source endpoint device 102 may be connected to the first IP network 106.1 while the destination endpoint device 104 may be connected to the second IP network 106.2. In an example embodiment, one or more of the endpoint devices 102, 104 may communicate directly with the satellite 108.

In use, a media stream, such as a voice communication, may be transmitted from the source endpoint device 102 to the destination endpoint device 104 via the IP networks 106.1, 106.2 and the satellite 108. The media stream may be "packetized" for transmission across the IP networks 106.1, 106.2 and the satellite link 108.1. Because of the nature of IP networks in general, individual packets may follow different physical routes and may therefore arrive delayed and asynchronously at their destination. This delay and asynchronicity may be referred to as persistent jitter because it may be present throughout the transmission of the media stream.

Also, the satellite link 108.1 may introduce a further delay because of the time taken for the transmission between Earth and the satellite 108 in orbit and back. A jitter buffer may be used to counteract this persistent jitter.

Some network components, such as the satellite 108, may from time-to-time be overloaded and suffer from congestion, thereby delaying transmission of the packets even further. This congestion, or similar bottlenecks, may only be transient (occurring from time-to-time) and this may be referred to as a transient delay or transient jitter and/or lag.

In an example embodiment, the system 100 may include a communications integration system 110 (e.g., an IPICS (IP Interoperability and Collaboration System) available from Cisco Systems, Inc.) that may be operable to host or facilitate communication of media streams. For example, an IPICS may host one or more VTGs (Virtual Talk Groups), conference calls, integrate different communication modalities, or the like.

Figure 2:
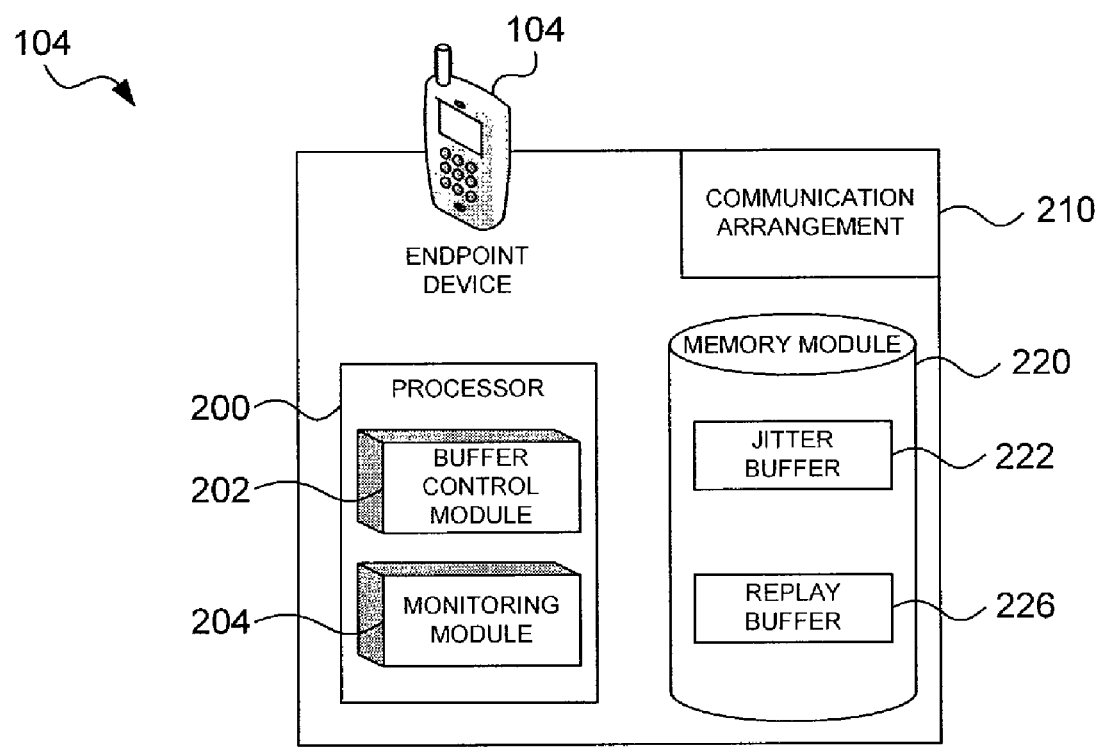
FIG. 2 shows an endpoint device, in accordance with an example embodiment, for buffering a media stream.

FIG. 2 shows example detail of the endpoint devices 102, 104. For ease of explanation, example detail is described with reference to the endpoint device 104 but it is to be appreciated that the detail may apply equally to endpoint device 102.

In accordance with an example embodiment, the endpoint device 104 may include a processor 200, a communication arrangement 210 and a memory module 220. The processor 200 may include conceptual modules that correspond to functional tasks performed by the processor 200. For example, the processor 200 is shown to include a buffer control module 202 and a monitoring module 204. To this end, the endpoint device 104 may include a machine-readable medium embodying instructions that, when executed, direct the operation of the processor 200 to perform the methodology described herein. The instructions, for example, may be in the form of a computer program. It is to be understood that the processor 200 may be one or more microprocessors, controllers, digital signal processors (DSPs) or any other suitable computing device, resource, hardware, or software.

The communication arrangement 210 may be operable to connect the endpoint device 104 to the IP network 106.2 to receive and send IP packets. The communication arrangement 210 may therefore be in the form of a network interface. The memory module 220 may comprise or host a jitter buffer 222 and a replay buffer 226. The buffers 222, 226 may provide temporary storage for IP packets or media stream segments. The endpoint device 104 may also include more permanent memory (not illustrated) for recording of storing previous telephone conversations.

The jitter buffer 222 may be sized in accordance with delayed or asynchronous packets associated with persistent jitter. The jitter buffer 222 may therefore have a size or length of between roughly 150 ms and 200 ms. This may be sufficient to counteract persistent jitter associated with general packet transmission across the IP networks 106.1, 106.2 and satellite link 108.1 when no particular network device is congested or overloaded. In an example embodiment, the jitter buffer 222 may be a static buffer having a fixed size (e.g. 200 ms). However, the jitter buffer 222 may be a dynamic buffer that is adjustable between a range of sizes (e.g. having a lower bound of 150 ms and an upper bound of 250 ms).

The replay buffer 226 may be sized to accommodate late-arriving packets associated with transient delays that are in excess of those accommodated by the jitter buffer 222. For example, if a particular network device is congested (e.g. the satellite 108), a longer than normal delay may temporarily be introduced into the transmission path of the packets. In an example embodiment, the replay buffer 226 may therefore have a size or length of between about one second and two seconds, which may be a typical delay time introduced when IP packets are transmitted across a congested satellite link (e.g. the satellite link 108.1). If the transmission path comprises two or more satellites, the replay buffer 226 may be sized accordingly. The replay buffer 226 may therefore be larger in size or length than the jitter buffer 222. In an example embodiment, the replay buffer 226 may be about ten times larger than the jitter buffer 222.

The buffer control module 202 may be configured to control operation of the buffers 222, 226. If the jitter buffer 222 is a dynamic buffer, the buffer control module 202 may be operable to vary the size of the jitter buffer 222 using a buffer adjustment algorithm based on packet traffic. The buffer adjustment algorithm may be any suitable algorithm known to a person of ordinary skill in the art.

The replay buffer 226 may be used only when transient delay (e.g., jitter and/or lag) is detected. Thus, in operation when only persistent jitter is present, the replay buffer 226 may be dormant. However, when packets arrive too late to be stored and played back from the jitter buffer 222 (e.g. the delays are larger than those able to be compensated for by the jitter buffer 222), instead of simply discarding these late-arriving packets, they may be stored, at least temporarily, in the replay buffer 226. It an example embodiment, the replay buffer 226 stores all the arriving packets and not only the late arriving packets.

The monitoring module 204 may be operable to monitor an incoming media stream (e.g. received via the communication arrangement 210) and the jitter buffer 222 for transient delays. Monitoring the incoming media stream may include monitoring an amount or rate of packets arriving late (e.g., packets arriving later than the delays that can be accounted for by the jitter buffer 222). Monitoring the jitter buffer 222 may include monitoring the number of remaining packets in the buffer at any given time. If a particular number of packets arrive late, the monitoring module 204 may detect a transient delay is present. In an example embodiment, monitoring an incoming media stream may include monitoring a voice quality of the stream for violation of a predefined quality threshold. Similarly monitoring the jitter buffer 222 may include detecting an event identifying an empty jitter buffer 222 wherein all the packets were played out before a new packet arrived and using identification of the event as a transient delay indicator.

It is to be appreciated that, in an example embodiment, as long as the system 100 does not experience transient delay, the jitter buffer 222 may continue to operate in a similar fashion as any other ordinary jitter buffer used in existing equipment. It should be also appreciated that the replay buffer 226, which can be implemented as a ring buffer, may continuously store the last few seconds of the arriving media packets. The buffer control module 202 may include a media analysis algorithm which analyzes the media in the replay buffer 226 and identifies word boundaries (e.g., as described below with reference to FIG. 5). The buffer control module 202 may then mark word boundaries within the replay buffer 226.

It is to be appreciated that any other device (e.g. the source endpoint device 102, the communications integration system 110, a plug-on device, or the like) may be configured to include the modules 202, 204 and the buffers 222, 226 to provide similar functionality to the endpoint device 104.

Figure 3:
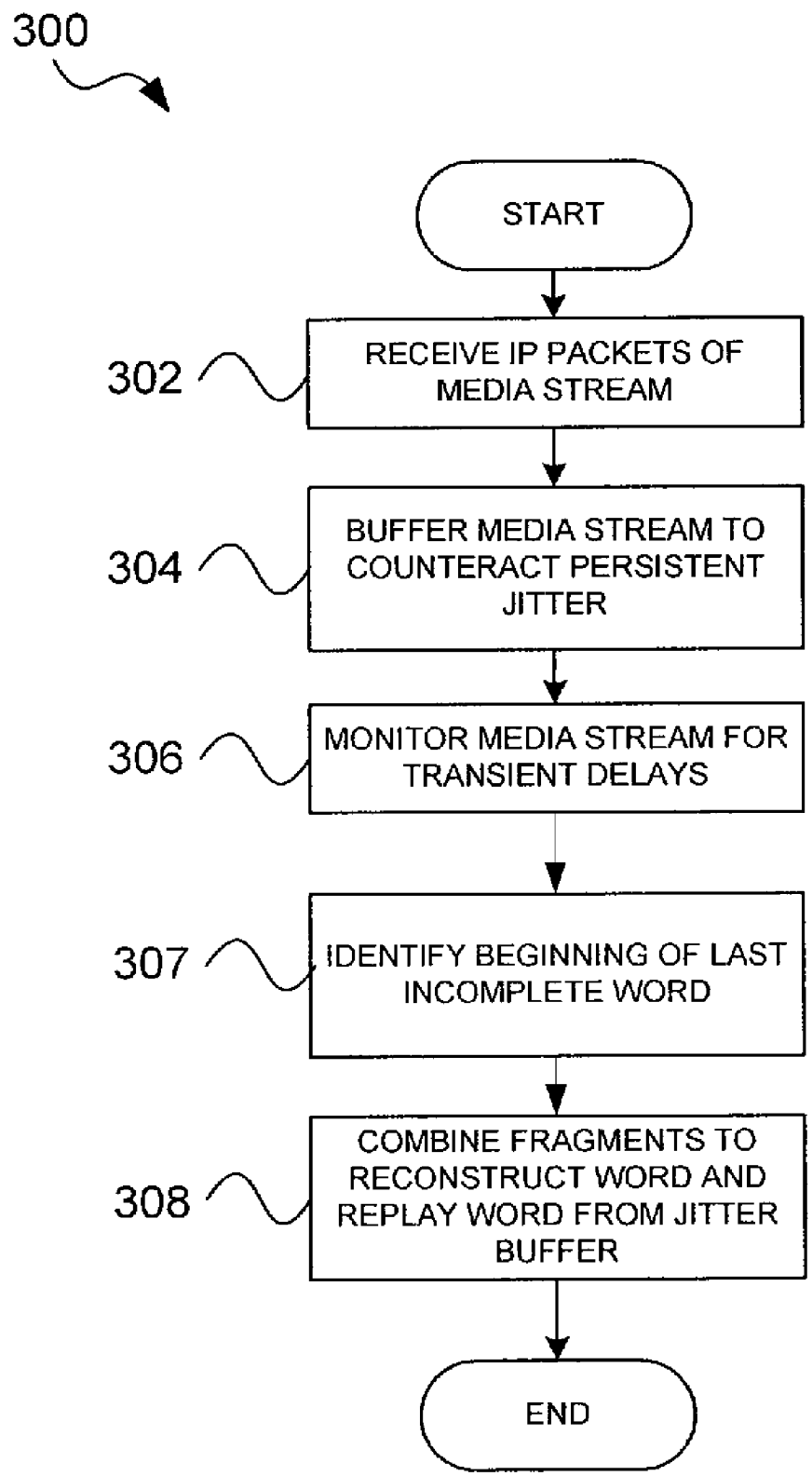
FIG. 3 shows a high-level flow diagram of a method, in accordance with an example embodiment, of buffering a media stream.

FIG. 3 shows a high-level flow diagram of a method 300, in accordance with an example embodiment, of buffering a media stream. The method 300 may be deployed in the endpoint devices 102, 104 and, accordingly, are described by way of example with reference thereto.

The method 300 is shown to comprise receiving, at block 302, a plurality of IP packets that constitute a media stream. Thereafter, as shown at block 304, the media stream is buffered using a jitter buffer to counteract persistent jitter in the media stream. The media stream is then monitored for transient delay (see block 306) and, in response to detecting transient delay, the method 300 may identify the beginning of the last incomplete word in the replay buffer 226 as a potential starting point for replaying the media stream (see block 307). Thereafter, when the delayed packets are received, the fragments from different packets for the word may be combined to reproduce the word as shown in block 308. The media may then be replayed as soon as the packets which were delayed by the transient delay become available for play out. For example, an earlier received fragment may be copied from the replay buffer 226 into the jitter buffer 222 where it may be combined with a late arriving packet so that the word is played out from the replay buffer 222 as a complete word. Thus, in an example embodiment, an earlier arriving fragment that has been played out by from jitter buffer 222, and hence has been flushed from the jitter buffer 222, may be copied back into the jitter buffer 222 and played out together with the late arriving fragment.

Figure 4:
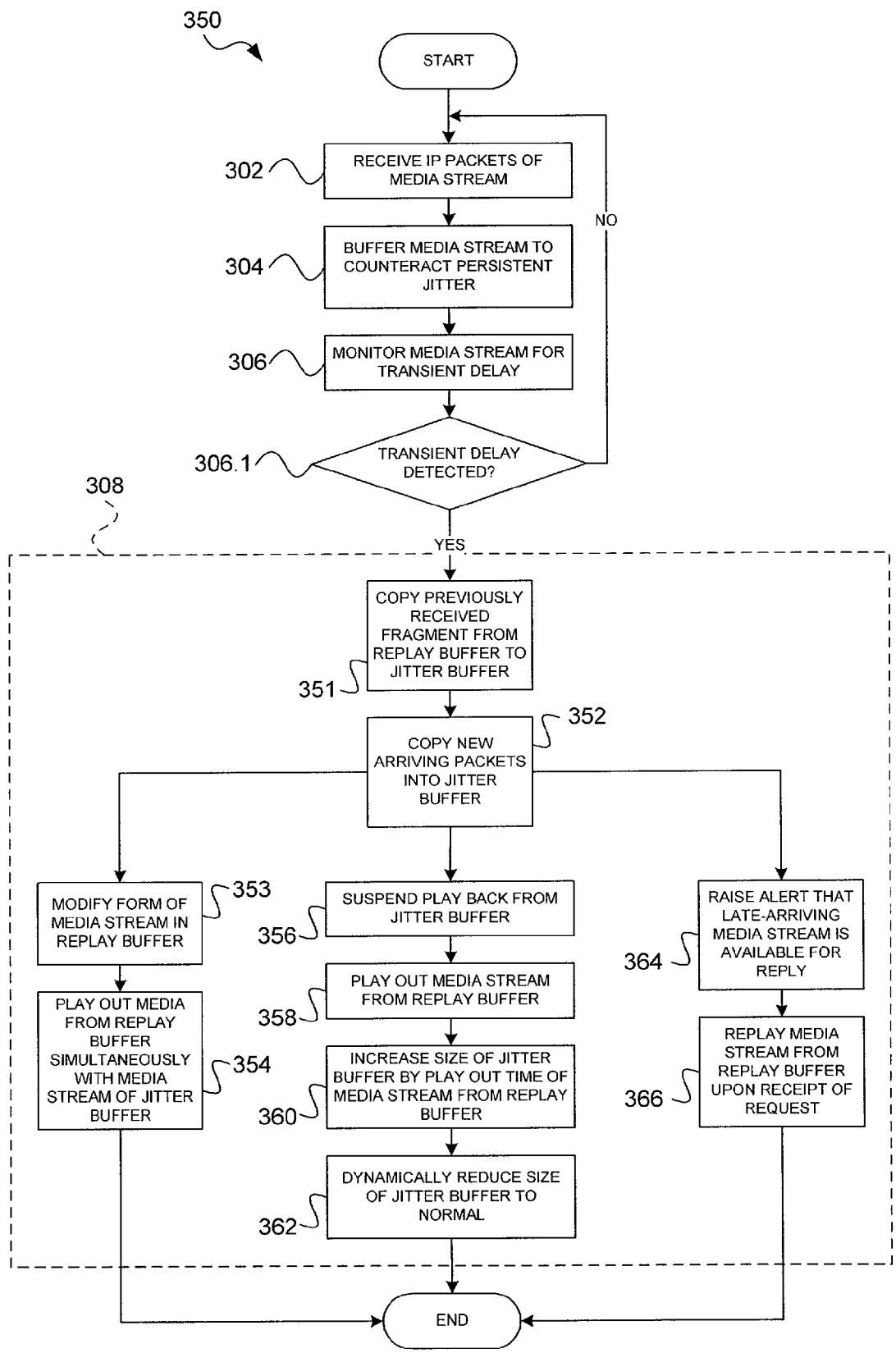
FIG. 4 shows a low-level flow diagram of a method, in accordance with an example embodiment, of buffering a media stream.
Figure 5:
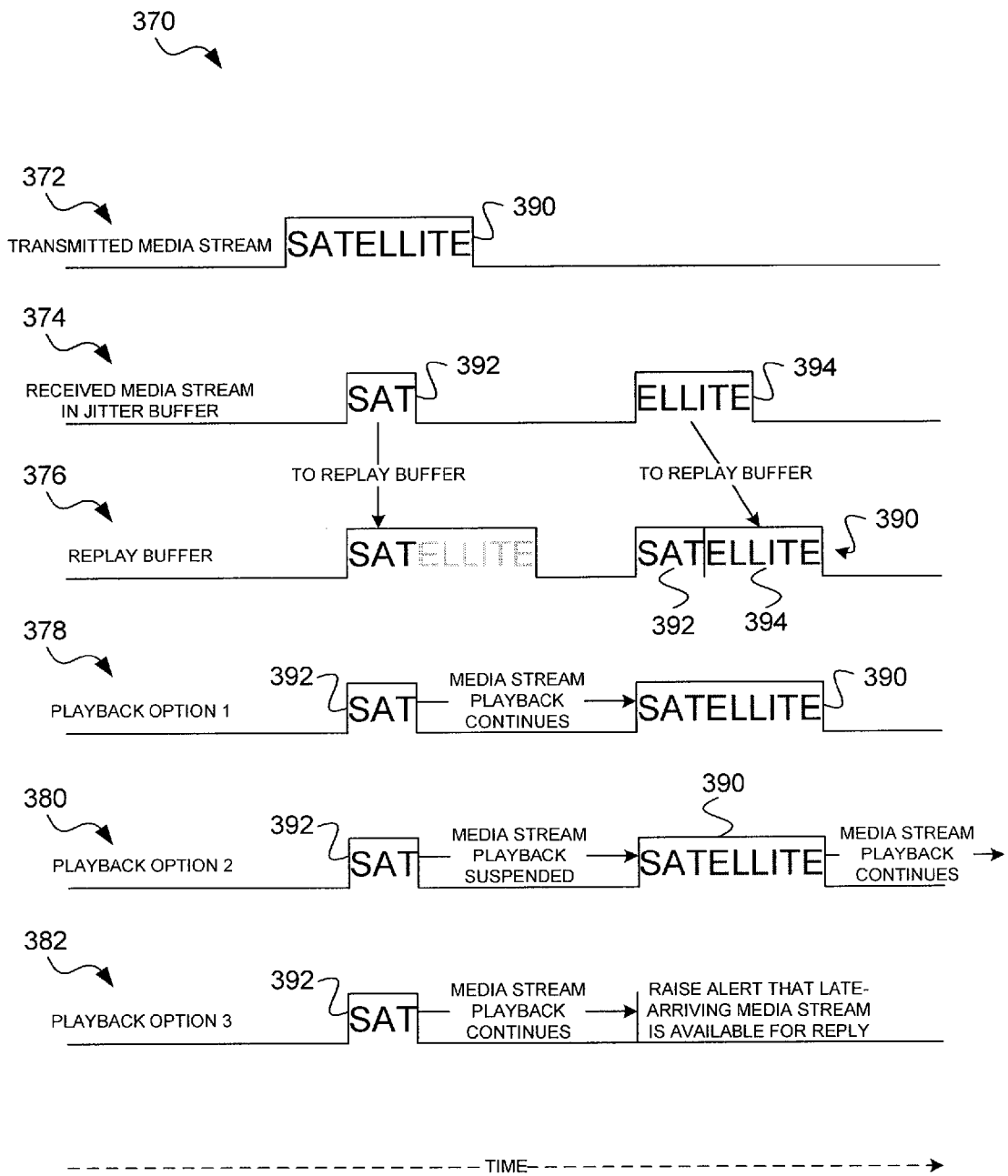
FIG. 5 shows an example timing diagram of a portion of a media stream.

FIG. 4 shows a low-level flow diagram of a method 350, in accordance with an example embodiment, of buffering a media stream. Although the method 350 is described by way of example with reference to FIGS. 1 and 2, it is to be appreciated that the method 350 may be deployed in other communication systems or devices. FIG. 5 shows example timing diagram 370 of a portion of a media stream in which the methods 300 and 350 are applied.

Referring to FIGS. 1, 4 and 5, the source endpoint device 102 may transmit a voice communication (or other media stream) to the destination endpoint device 104. The media stream may be packetized for transmission across the IP network 106.1. The two example IP networks 106.1, 106.2 may be remote from each other and may require or use the satellite link 108.1 to connect to each other. For example, the communications integration system 110 may be arranged in the transmission path between the satellite 108 and the destination endpoint device 104 such that the communications integration system 110 is operable to buffer the media stream and route the buffered media stream to the destination endpoint device 104. It should be appreciated that, in other example embodiments, the media packets may flow from the source endpoint 102 to the destination endpoint 104 directly without passing through the communications integration system 110. In this case, the communications integration system 110 may facilitate and control operation of the system 100.

For example, a user of the source endpoint device 102 may have spoken a sentence wherein a media portion 390 (see FIG. 5) of the sentence includes the word "satellite" (or any other word communicated utilizing multiple packets). An example transmitted media stream from the endpoint device 102 is shown by arrow 372 in FIG. 5.

The IP networks 106.1, 106.2 and/or the satellite link 108.1 may introduce a light to moderate persistent jitter into the media stream. For example, the persistent jitter may be caused because IP packets may follow different physical paths, some taking longer than others. The IP packets of the media stream may therefore arrive asynchronously at the destination endpoint device 104. The destination endpoint device 104 therefore receives, as shown at block 302, a plurality of IP packets of the media stream. The destination endpoint device 104 may be configured continuously to buffer (see block 304) the incoming media stream to remove persistent jitter. In an example embodiment, in parallel with the processing of the incoming packets by the jitter buffer 222, the incoming packets are stored in the replay buffer 226 which, in some example embodiments, is implemented as a ring buffer. The jitter buffer 222 may, for example, be a dynamic jitter buffer having a lower bound of 150 ms and an upper bound of 250 ms. The bounds of 150 ms to 250 ms may provide sufficient time to counteract any jitter or asynchronicity of packets due to any persistent jitter inherent in the transmission path (e.g., the networks 106.1, 106.2 or satellite link 108.1).

Therefore, a relatively small jitter buffer 222 may be sufficient to counteract persistent jitter while introducing only a relatively small delay into the media stream and thus not substantially disrupting communication (see block 304). However, from time-to-time, a network device or other element within the transmission path may introduce longer delays that more severely deteriorate communication. In such a case, packets may be delayed for up to one to two seconds. The jitter buffer 222, due to its relatively small size, may no longer be able to mask the impact of this transient delay. When this occurs the system 100 may utilize the replay buffer 226 and the buffer control module 202 to alleviate the impact of the transient delay without increasing the size of the jitter buffer 222.

The replay buffer 226 may be sized between one and two seconds (e.g. 1.5 seconds). The replay buffer 226 may continuously store the arriving media packets in its first-in-first-out (FIFO) buffer. In one example embodiment, the replay buffer 226 is implemented as a ring buffer. In an example embodiment, the buffer control module 202 may analyze the media in the replay buffer 226 and identify word boundaries as mentioned above. The buffer control module 202 may then mark word boundaries within the replay buffer 226. As the replay buffer 226 is bigger or longer, it may be able to store packets that have arrived substantially earlier even though it may also be only a temporary buffer.

For example, one or more packets communicating the media portion 390 ("satellite" in the given example) may be delayed en route to the destination endpoint device 104. A first fragment ("sat") 392 of the word "satellite" may arrive in a timely manner without any substantial lag or delay (e.g., just the lag caused by the persistent jitter). However, during transmission of the media stream, the delays may arise in the media path (e.g., the satellite 108 may become congested). Accordingly, a second fragment ("ellite") 394 of the word "satellite" may be delayed relative to the first fragment 392 in reaching the destination endpoint 104 (see arrow 374).

In response to the transient delays, the buffer control module 202 may be operable to implement a PLC algorithm which may attempt to artificially generate replacement packets for late arriving or lost packets (e.g., packets communicating the fragment "ellite"). Such a PLC algorithm may effectively mask one or even two missing packets, but more than this and audio quality may degrade noticeably and may sound jarred or be altogether incomprehensible.

The monitoring module 204 may be operable to monitor (see block 306) the incoming media stream or the jitter buffer 222 to determine if there is any transient delay. In an example embodiment, the monitoring module 204 may detect, at decision block 306.1, if transient delay is present in response to a rate or amount of late-arriving packets failing predetermined packet arrival criteria. For example, if four or more consecutive IP packets arrive late and miss the window to be replayed from the jitter buffer 222, the monitoring module 204 may determine that a transient delay event has occurred. In these circumstances, packets of the first fragment 392 that arrived in time may be placed temporarily in the jitter buffer 222 for playback in conventional fashion. If desired, the buffer control module 202 may insert one or more PLC packets in an attempt to mask the missing packets. A user of the destination endpoint device 104 may therefore hear a degraded or distorted signal that he is not able clearly to discern.

However, when the method 350 identifies the occurrence of a transient delay event, the buffer control module 202 may identify the beginning of the last word fragment 392 in the replay buffer 226 (e.g., "sat" in the given example). Thereafter, as shown in block 351 and this media fragment may be copied into jitter buffer 222 for future play out. The buffer control module 202 may then freeze the play out of media stream from jitter buffer 222 and await for the late arrival of voice packets corresponding to media fragment 394. Thus, in the give example, when the late arriving packets corresponding to the fragment "ellite" arrive, payout from the jitter buffer 222 may then resume so that the complete word "satellite" is played out as described further below.

The second fragment 394 may comprise a relatively large number of packets (e.g. more than four) and thus a PLC algorithm may not effectively extrapolate the delayed fragment ("ellite" in the given example). In these example circumstances, the system 100 may use a different algorithm to reconstruct the entire word. In accordance with an example embodiment, instead of merely playing or discarding the packets comprising the second fragment 394, the buffer control module 202 copies in operation 352 the new arriving packets into the jitter buffer and reactivates the play out of media from the jitter buffer 222. The two fragments 392, 394 may then be reconstituted, for example, in the jitter buffer 222 to form the media portion 390 ("satellite") constituted by the first and second fragments 392, 394 that is available for playback from jitter buffer 222. Various example embodiments may use one or more different ways in which the complete media portion 390 of a sentence (see arrows 378 to 382 in FIG. 5) is played back to a listener. It will be appreciated that the replay buffer 226 may be sized so that it may buffer several fragments of a single word or of a plurality of words so that fragments of words delayed are reunited in the replay buffer 226 even though they have been discarded by the jitter buffer 222.

For example, a first option (see arrow 378) may be provided wherein packets, which have been received in a timely manner, continue to be played back in a normal manner from the jitter buffer 222. When the late arriving packets have finally arrived the media portion 390 of the sentence is available for playback. The buffer control module 202 may then modify or change, at block 353, the form of the media portion 390 stored in the replay buffer 226 so that it is distinguishable over ordinary playback of the media stream comprising packets that have arrived in a timely manner. For example, the volume of the media portion 390 may be altered so that it sounds like a whisper, the pitch may be altered so that the media portion 390 sounds different or, if the media channel is a stereophonic channel, the stereophonic properties may be altered, for example so that the media portion 390 is played back only through either the left or the right channel.

Thus, in an example embodiment, the media potion 390 from the replay buffer 226 may then be played back (see block 354) simultaneously with the current incoming media stream (see arrow 378 in FIG. 5) so that the user of the destination endpoint device 104 may now hear the media portion 390 that he or she previously missed, while still listening to the present incoming media stream. The replay buffer 226 may then be available to be overwritten should any future fragment(s) of the media stream be delayed. This example embodiment may avoid adjustment of the jitter buffer 222 and playback may be automatic.

In addition or instead, a second option (see arrow 380) may be provided wherein, once the media portion 390 has been reconstituted in the replay buffer 226, ordinary playback of the incoming media stream is suspended (see block 356). The media portion 390 may then be played back so that the user of the destination endpoint device 104 may direct his or her full attention to the playback of the media portion that he or she previously missed (see block 358). While ordinary playback of the incoming media stream is suspended (see block 356), the size of the jitter buffer 222 may progressively be increased to accommodate the incoming media stream so that it may be played back for the user once playback of the media portion 390 has been concluded (see block 360). In such a case, the jitter buffer 222 may be dynamic. Once normal playback resumes from the now enlarged jitter buffer 222, the buffer control module 202 may gradually reduce, at block 362, the size of the jitter buffer 222 to its normal or nominal size before enlargement. This may be done in accordance with existing buffer adjustment algorithms.

In addition or instead, a third option (see arrow 382) may be provided wherein the media portion need not necessarily be played back automatically. For example, in response to detection by the monitoring module 204 that reconstituted media portion is available for playback, the endpoint device 104 may generate an alert notifying the user that the media portion is available (see block 364). The alert may be generated by means of a display if the endpoint device 104 includes a display screen and/or by means of an audible prompt (e.g., a beep). The user may then select whether or not he or she wishes to hear the media portion that was previously missed. Thus, the endpoint device 104 may be operable to receive a user input, for example via a user interface (e.g. a hard button or a soft button) to indicate that the user would like to hear the reconstituted media portion 390. In response to receiving the user input, the endpoint device 104 may replay the media portion 390 from the replay buffer (see block 366).

It is to be understood that these options are not exhaustive and other options that are not illustrated may be made available to the destination endpoint device 104. Also, the endpoint device 104 may be operable to receive an input from the user to pre-select one of the options, for example during configuration of the endpoint device 104.

Figure 6:
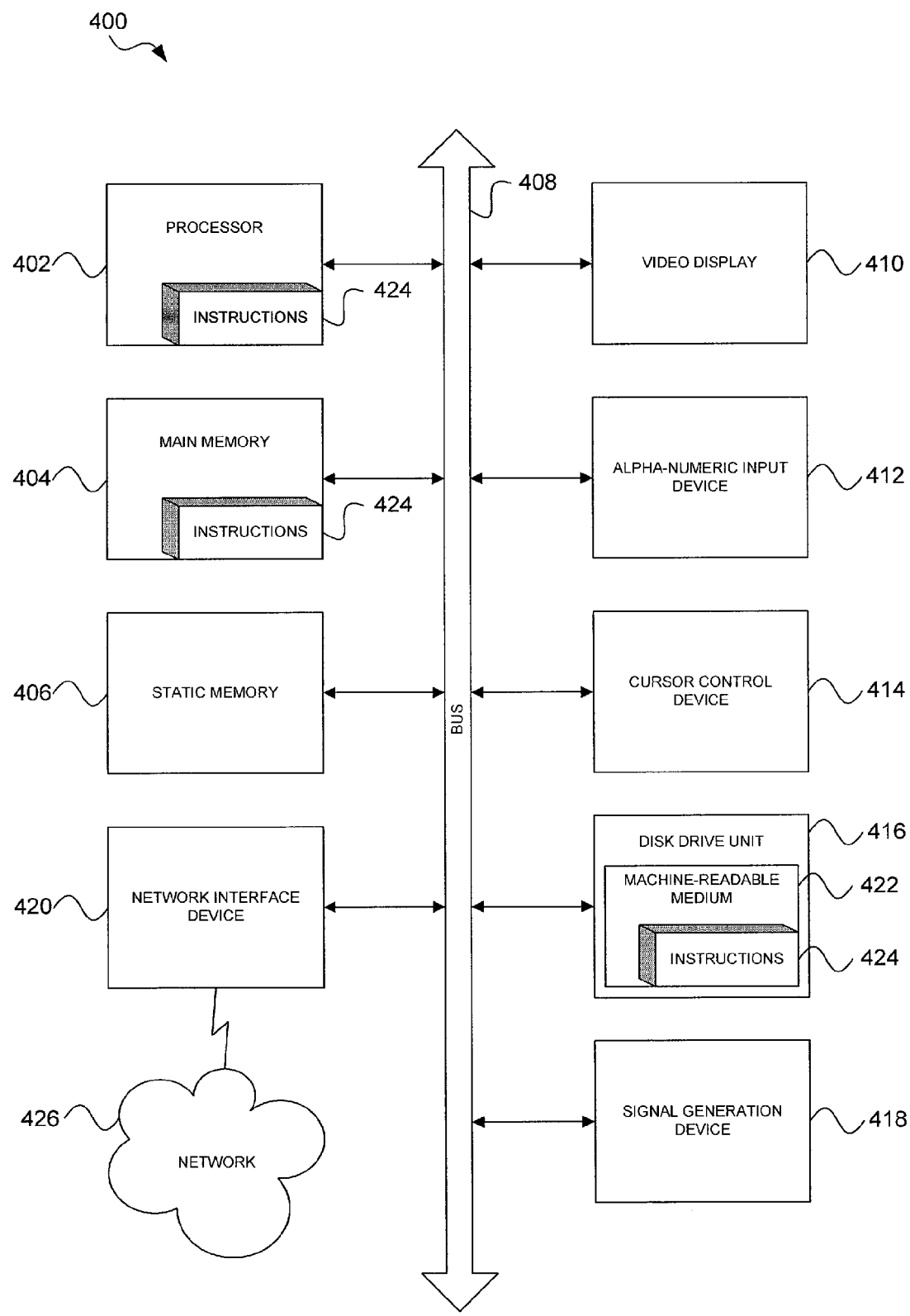
FIG. 6 shows a diagrammatic representation of a machine in the example form of a computer system within which a set of instructions, for causing the machine to perform any one or more of the methodologies discussed herein, may be executed.

FIG. 6 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD), plasma display or a cathode ray tube (CRT)). The computer system 400 may also include an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or used by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 using any one of a number of well-known transfer protocols (e.g., HTTP and/or FTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiments, or that is capable of storing, encoding, or carrying data structures used by or associated with such a set of instructions. The term "machine-readable medium" shall accordingly be taken to include, but not be limited to, solid-state memories, optical media and magnetic media.

The computer system 400 may be configured or programmed to buffer a media stream as above defined, for example embodying the endpoint device 104.

It may be an advantage of an example embodiment that, because late-arriving packets are not discarded but instead are stored (at least temporarily), the need for a listener to request a speaker to repeat a statement or sentence is reduced, thereby conserving satellite bandwidth.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of buffering a media stream, the method comprising:

receiving a plurality of IP packets of the media stream, each packet providing a fragment of a portion of the media stream;

buffering the portion of the media stream in a jitter buffer using the fragments provided by the received packets, the jitter buffer buffering the portion of the media stream for a buffer duration, and the jitter buffer discarding late-arriving fragments, the late-arriving fragments being received with a delay longer than the buffer duration;

buffering all incoming packets of the portion of the media stream in a replay buffer using the fragments provided by the incoming packets, the replay buffer being larger than the jitter buffer; and combining a first received fragment and a second received fragment, the first received fragment having been received with a delay shorter than the buffer duration, and the second received fragment being a late-arriving fragment, the first received fragment and the second received fragment being combined in the jitter buffer.

2. The method of claim 1, wherein the second received fragment is delayed relative to the first received fragment by a time period that is longer than the buffer duration.

3. The method of claim 1, further comprising:
generating a replacement fragment using a PLC (Packet Loss Concealment) algorithm;
storing the replacement fragment; and
replacing the replacement fragment with an actual fragment when a late-arriving fragment is received.

4. The method of claim 1, further comprising playing back fragments from the replay buffer simultaneously with a jitter buffer media stream from the jitter buffer.

5. The method of claim 4, which comprises modifying playback of the jitter buffer media stream or the fragments of the replay buffer such that they are distinguishable.

6. The method of claim 4, further comprising:
playing back a jitter buffer media stream;
determining when the replay buffer includes a media portion that includes a late-arriving fragment;
suspending playback of the jitter buffer media stream; and
playing back the combined fragments.

7. The method of claim 6, further comprising increasing a size of the jitter buffer by a playback time corresponding to the playback time of the combined fragments.

8. The method of claim 7, further comprising dynamically reducing the size of the jitter buffer to its former size.

9. The method of claim 1, wherein the combining of the first received fragment and the second received fragment in the jitter buffer occurs when the second received fragment arrives.

10. The method of claim 1, further comprising:
monitoring a quality of a jitter buffer media stream from the jitter buffer to determine if audio quality meets a quality threshold; and
playing back combined fragments from the replay buffer when the quality is below the quality threshold.

11. A device comprising:
a communication arrangement to receive a plurality of IP packets of a media stream, each packet providing a fragment of a portion of the media stream;
a jitter buffer to buffer the portion of the media stream using the fragments provided by the received packets, the jitter buffer to buffer the portion of the media stream for a buffer duration, and to discard late-arriving fragments, the late arriving fragments being received with a delay greater than the buffer duration;

a replay buffer to buffer all incoming packets of the portion of the media stream using the fragments provided by the incoming packets, the replay buffer being larger than the jitter buffer; and a module to combine a first received fragment and a second received fragment, the first received fragment having been received with a delay shorter than the buffer duration, and the second received fragment being a late arriving fragment, the first received fragment and the second received fragment being combined in the jitter buffer.

12. The device of claim 11, wherein the second fragment is delayed relative to the first fragment by a time period that is longer than the buffer duration.

13. The device of claim 11, further comprising a processor configured to:

generate a replacement fragment using PLC (Packet Loss Concealment) algorithm;

store the replacement fragment; and replace the replacement fragment with an actual fragment when a late-arriving fragment is received.

14. The device of claim 11, wherein fragments are played back from the replay butter simultaneously with a jitter buffer media stream from the jitter buffer.

15. The device of claim 14, wherein playback of the jitter buffer media stream or the fragments from the replay buffer is modified such that they are distinguishable.

16. The device of claim 11, which comprises a processor configured to:

play back a jitter buffer media stream;

determine when the replay buffer includes a media portion that includes a late-arriving fragment;

suspend playback of the jitter buffer media stream; and play back combined fragments.

17. The device of claim 16, a size of the jitter buffer is increased by a playback time corresponding to the playback time of the combined fragments.

18. The device of claim 17, wherein the size of the jitter buffer is dynamically reduced to its size prior to increasing its size.

19. The device of claim 11, wherein the first received fragment and the second received fragment are combined in the jitter buffer when the second received fragment arrives.

20. The device of claim 11, further comprising:

a monitoring module to monitor a quality of a jitter buffer media stream from the jitter buffer to determine if audio quality meets a quality threshold; and a processor to play back combined fragments from the replay buffer when the quality is below the quality threshold.

21. A machine-readable non-transitory medium embodying instructions which, when executed by a machine, cause the machine to:

receive a plurality of IP packets of a media stream, each packet providing a fragment of a portion of the media stream;

buffer the portion of media stream in a jitter buffer using the fragments provided by the received packets, the jitter buffer buffering the portion of the media stream for a buffer duration, and the jitter buffer discarding late-arriving fragments, the late-arriving fragments being received with a delay longer than the buffer duration;

buffer all incoming packets of the portion of the media stream in a replay buffer using the fragments provided by the incoming packets, the replay buffer being larger than the jitter buffer; and combine a first received fragment and a second received fragment, the first received fragment having been received with a delay shorter than the butler duration, and the second received fragment being a late-arriving fragment the first received fragment and the second received fragment being combined in the jitter buffer.

22. An apparatus comprising:

means for receiving a plurality of IP packets of a media stream, each packet providing a fragment of a portion of the media stream;

means for buffering the portion of media stream in a jitter buffer using the fragments provided by the received packets, the jitter buffer to buffer the portion of the media stream for a buffer duration, and the jitter buffer to discard late-arriving fragments, the late-arriving fragments being received with a delay longer than the buffer duration;

means for buffering all incoming packets of the portion of the media stream in a replay buffer using the fragments provided by the incoming packets, the replay buffer being larger than the jitter buffer; and means for combining a first received fragment and a second received fragment, the first received fragment having been received with a delay shorter than the buffer duration, and the second received fragment being a late-arriving fragment, the first received fragment and the second received fragment being combined in the jitter buffer.

* * * * *

UNITED STATES PATENT AND TRADEMARK OFFICE
CERTIFICATE OF CORRECTION

PATENT NO. : 8,160,112 B2
APPLICATION NO. : 11/856461
DATED : April 17, 2012
INVENTOR(S) : Shmuel Shaffer et al.

It is certified that error appears in the above-identified patent and that said Letters Patent is hereby corrected as shown below:

In column 11, line 23, in Claim 14, delete "butter" and insert -- buffer --, therefor.

In column 11, line 30, in Claim 16, delete "play back" and insert -- playback --, therefor.

In column 11, line 34, in Claim 16, delete "play back" and insert -- playback --, therefor.

In column 11, line 35, in Claim 17, delete "a" and insert -- wherein a --, therefor.

In column 12, line 1, in Claim 20, delete "play back" and insert -- playback --, therefor.

In column 12, line 21, in Claim 21, delete "butler" and insert -- buffer --, therefor.

In column 12, line 23, in Claim 21, delete "fragment" and insert -- fragment, --, therefor.

Signed and Sealed this
Thirty-first Day of July, 2012

David J. Kappos
*Director of the United States Patent and Trademark Office*